Figure 1:
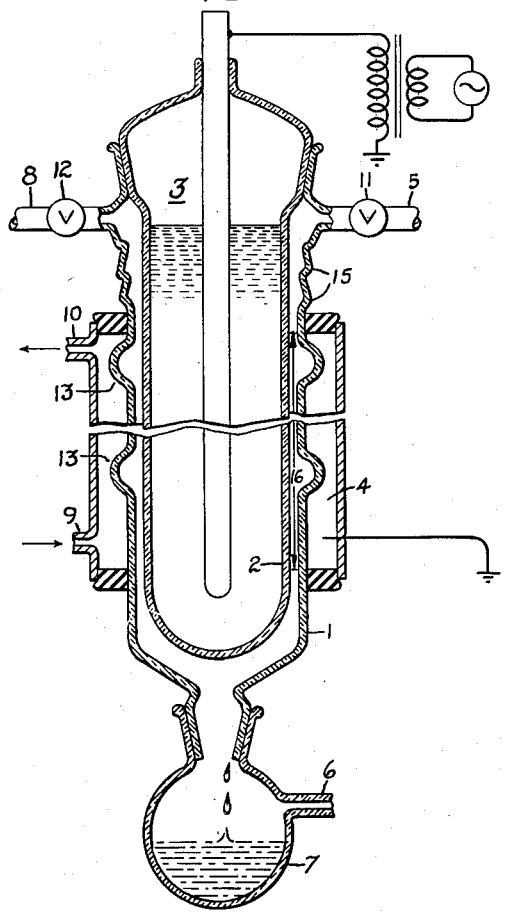

Jan. 24, 1956  D. W. CAIRD  2,732,340
OZONE OXIDATION REACTOR
Filed March 27, 1953

Inventor:
David W. Caird,
by
His Attorney.

United States Patent Office 2,732,340
Patented Jan. 24, 1956

2,732,340

OZONE OXIDATION REACTOR

David W. Caird, Pittsfield, Mass., assignor to General Electric Company, a corporation of New York Application March 27, 1953, Serial No. 344,950

3 Claims. (Cl. 204—321)

My invention relates to a new and improved ozone oxidation reactor designed for the ozonization of organic compounds, and is concerned more particularly with a generator of the silent electric discharge type.

One of the objects of my invention is to provide an ozone oxidation reactor in which generation of ozone and nearly simultaneous ozonization of organic compounds to oxygenated compounds can be performed with greater efficiency than heretofore attained.

Another object of my invention is to provide an ozone oxidation reactor in which ozone is generated by subjecting an oxygen-containing gas to the influence of a silent electric discharge in the presence of a reactive organic compound which is subjected to the electric discharge in the form of a film to present a relatively large surface and which reacts with the ozone as rapidly as it is formed.

A main object of my invention is to provide an ozone oxidation reactor in which the aforementioned objects are accomplished with greater possible efficiency and maximum product yield by controlling the distribution and turbulence of the reactive organic film in such a manner that essentially complete consumption by the reactive organic film of the ozone generated by the silent electric discharge is achieved, and at the same time completely ozonized product is produced. The product so obtained is free of contamination with unreacted organic feed stock which may be otherwise present where organic film distribution is not controlled and where channelling of the feed stock may occur.

Other and further objects of this invention will be apparent to those skilled in the art as a reading of this specification proceeds.

Ozone is presently best produced by means of 60-cycle electric discharge between concentric electrodes in which the electric discharge current is terminated at one end (Frolich-type ozonator) or at both ends (Siemens-type ozonator) by an insulating layer such as glass or porcelain. Electrode geometry provides a nearly uniform electric field, and the insulating layer functions as a series ballast which stabilizes the discharge with the effect of limiting the current to that of the so-called silent electric discharge. However, the net production of ozone, from generators of this type, available for further reaction in a secondary reaction zone, is low for reasons developed below.

In accordance with my invention, I have now unexpectedly found that in order to obtain maximum power yields of ozone, it is necessary to (a) provide adequate cooling of the generator for removal of the unused heat energy developed during ozone formation since ozone decomposition is rapidly accelerated by temperature; and (b) to remove ozone from the generator as rapidly as formed and in low concentration since decomposition occurs simultaneously with generation in the discharge. These requirements constitute the theoretical basis for the development of "in-situ" generators in which a desired organic feed stock is present, as in my invention, to react immediately with ozone as it is formed and thus inhibit decomposition reactions.

Figure 2:
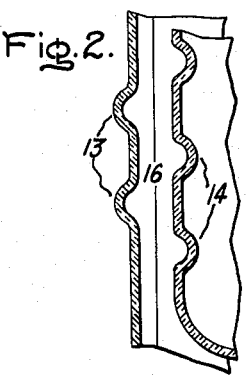

In accordance with my invention, I have found that these and other objects can be realized by modifying the design of existing generators to include "nodes" or recesses encircling the stressed portion of the outer dielectric tube in the region subjected to electric stress, or encircling the stressed portions of both the inner and outer tubes of an all glass Siemens-type generator, for instance, as shown in the accompanying drawing in which Fig. 1 is a view partly in elevation and partly in cross-section of the reactor and Fig. 2 is a fragmentary section of a modification. This novel modification in design, among others, provides for better film distribution of the organic compound to be reacted, and far longer and more uniform residence time of the organic feed in the reaction zone of the generator than is obtained in ordinary apparatus of similar design but where such nodes are not present. The primary purpose of these nodes or recesses is to prevent channeling of unreacted feed through the unit and to assure maximum exposure of organic feed in the form of a film at all times.

The "nodes" or recesses, broadly described above, are present in the portion of the apparatus subjected to the silent electric discharge. They resemble rounded ridges and each completely surrounds the circumference of the outer dielectric member tube of the generator. The radius of each individual "node" or recess, in one preferred embodiment, is approximately 0.5 cm.±0.2 cm. The number of such nodes, their radius and spacing is unlimited. This, of course, varies with the overall dimensions of the stressed portions of the reactor. For example, good results are obtained by employing 5 "nodes" of about 0.75 cm. radius spaced 5 inches apart. Still further improved results are obtained by employing 12 "nodes" of about 0.5 cm. radius spaced 2 inches apart.

In another embodiment of my invention, the inner dielectric tube of the generator may also be "noded," as illustrated in Fig. 2 of the accompanying drawing.

In a preferred embodiment of my invention, I employ a generator containing two dielectric tubular members, one inside of the other, the inner tubular member having an enlarged upper section engaging the upper section of the outer tubular member to form a gas-tight seal. The space between the walls of these tubes comprises a reaction zone having an organic feed inlet spaced adjacent the top of the outer tube and shoulders below this inlet for organic feed distribution. The outer dielectric tube contains the previously described "nodes" or recesses for providing a more turbulent and more uniform film of organic compound. At the lower end of the reactor, an inlet is provided for the introduction of an oxygen-containing gas. The electrodes necessary for producing the silent electric discharge are provided by a salt solution in the inner tube and contained in a jacket surrounding the outer tube, respectively.

The actual reaction zone is a gap between the inner and outer dielectric tubes. This gap may be varied as desired. In examples detailed hereinafter three interchangeable inner glass tubes having diameters to provide for 4 mm., 7 mm. and 11 mm. spacings, respectively were employed.

A more complete understanding of my invention may be had from the following description when considered with the drawing, in which Figs. 1 and 2 are diagrammatic illustrations of the generator reactors shown in vertical section. These modified designs are improvements over the apparatus described and illustrated in the co-pending application of L. S. Moody, Serial No. 348,639, filed April 14, 1953, and assigned to the same assignee as the present application.

Referring particularly to Fig. 1, the silent electric discharge generator comprises two concentric tubes, an outer dielectric tube 1 and an inner dielectric tube 2 with a variable gap space between the two. It will be noted that the stressed portion of the outer tube is provided with "nodes" 13. In the modification shown in Fig. 2, the stressed portion of the inner tube 2 is provided with "nodes" 14.

A high voltage electrode 3 is an electrolyte such as an aqueous salt solution in the inner tube with a brass rod extending to the bottom and connected to the high voltage terminal of the transformer. The ground potential electrode 4 is provided by salt solution circulating in a jacket surrounding the outer tube of the unit. The jacket is connected to ground by means of a plated-copper ribbon lead diagrammatically illustrated. A salt solution circulating through this jacket serves both as the ground potential electrode and for partial cooling or heating of the generator. Organic feed is introduced at a point adjacent the top of the generator through inlet 5 controlled by valve 11 and is distributed by means of one or more weirs or distributing rings 15 around the inner surface of the outer tube. The "nodes" 13 within the area 16 provide for superior distribution and turbulence of the feed which results in a much greater reactive surface. Area 16 is the actual reaction zone and is under electrical stress during reaction. Under the effect of the electric discharge continuously provided by the afore-mentioned electrodes, a minor proportion of organic feed has been found to transfer to the surface of the inner tube. An oxygen-containing gas is introduced into the generator through an inlet tube 6 at the bottom of the generator and reaction products are collected in receiver 7. An outlet tube 8, controlled by valve 12, adjacent the top of the unit permits the removal of carbon dioxide and carbon monoxide gases which in some cases may be formed in small but appreciable quantities during reaction. Such gases can be flushed from the generator by a small oxygen "bleed" to prevent vapor locking from shutting off the oxygen feed. Elements 9 and 10 are the water inlet and outlets, respectively, of the water jacket (potential electrode) 4.

In practicing my invention, an oxygen-containing gas is usually flushed through the generator to remove all residual gases. An organic feed reservoir (not shown in the drawing) is charged with a selected organic compound and pressurized to give the necessary hydrostatic head. Desired organic feed rate is established by valve 11, and maintained constant during operation. As a safety precaution, organic feed is allowed to film the generator surfaces before operating voltage is applied.

In order to obtain optimum operation, an equilibrium should be established between organic feed input and product recovery by conditioning each run for 1½ to 2 hours at operating voltage. This forerun may be recirculated to the generator through organic feed inlet 5. Although oxygenated products are formed almost immediately, 20 to 30 minutes usually elapse before product begins to leave the generator, and about 1 hour is required before product begins to drain into the receiver at a constant rate. At the end of the conditioning period, the stopcock to the forerun receiver is closed. Simultaneously, metering of the gas leaving outlet tube 8 is started, and an oxygen containing feed gas supply is transferred to a weighed supply cylinder. The forerun receiver is then replaced with a clean, tared 300 ml. receiver without interrupting operation, and the stopcock to the product line is opened. A momentary pressure surge in pressurizing the receiver is assumed to have negligible effect on the run. A slight quantity of product which backs up in the product line during receiver changing normally drains readily into the receiver and has no effect on equilibrium conditions.

Below, in Table I, are given the dimensions of the various generators employed in carrying my invention into effect.

TABLE I

*Dimensions of "in-situ" generators*

| Generator No. | No. of "Nodes" | Appr. Rad.¹ of "Nodes," cm. | Outer Tube | | | Inner Tube | | | Gap Spac'g, mm. | Effect. Length, In. | Effect. Electr. Area, ft.² | Glass Rod Packing | | |
|---|---|---|---|---|---|---|---|---|---|---|---|---|---|---|
| | | | I. Dia. | | Approx. Wall Thickness, mm. | O. Dia. | | Approx. Wall Thickness, mm. | | | | O. D., In. | I. D., In. | Length, In. |
| | | | mm. | In. | | mm. | In. | | | | | | | |
| 1 | 5 | 0.7 | 59.0 | 2 5/16 | 2.4 | 51.0 | 2 | 2.0 | 4.0 | 26 | 2.48 | | None | |
| 2 | 5 | 0.7 | 59.0 | 2 5/16 | 2.4 | 37.5 | 1½ | 2.0 | 11.0 | 26 | 2.35 | | None | |
| 3 | 5 | 0.7 | 59.0 | 2 5/16 | 2.4 | 37.5 | 1½ | 2.0 | 11.0 | 26 | 2.35 | 2 5/16 | 1 5/8 | 25½ |
| 4 | 5 | 0.7 | 59.0 | 2 5/16 | 2.4 | 37.5 | 1½ | 2.0 | 11.0 | 26 | 2.35 | 2 5/16 | 1 5/8 | 14¼ |
| 5 | 12 | 0.5 | 59.0 | 2 5/16 | 2.4 | 45.0 | 1¾ | 2.0 | 7.0 | 26 | 2.37 | | None | |
| 6 | 0 | | 59.0 | 2 5/16 | 2.4 | 45.0 | 1¾ | 2.0 | 7.0 | 26 | 2.30 | | None | |
| 7** | 0 | | 59.0 | 2 5/16 | 2.4 | 48.0 | 1 7/8 | | 5.5 | 26 | 2.38 | | None | |

¹ Approximate radius.
² The inner tube of ozonizer #7 consists of a stainless steel tube which functions as the high voltage electrode and has no adjacent dielectric.

In Table II below, power input data are given under comparable operating conditions for generators having 4 mm., 7 mm., and 11 mm. spacegaps between the dielectric tubes. From this data, it is apparent that in the operating voltage range, power input increases appreciably with the gap between 4 mm. and 7 mm. Very little change appears at gaps between 7 mm. and 11 mm.; and at lower voltages, e. g., 30¼ kv., power input decreased for the 11 mm. gap. Since product capacity is proportional to power, it is seen that the 4 mm. spacing is definitely inferior, and the 11 mm. spacing offers no advantage up to the maximum operating voltage investigated. However, the 7 mm. gap generators have superior power characteristics to either 4 mm. or 11 mm. gap generators up to the maximum operating voltages feasible.

TABLE II

| Generator | Gap Distance (mm.) | Design | Effective Electrode Area (ft.²) | Net Power | |
|---|---|---|---|---|---|
| | | | | Watts @ 30¼ kv. | Watts @ 33.0 kv. |
| 1 | 4 | 5 Nodes | 2.48 | 100 | 111 |
| 2 | 11 | ...do... | 2.35 | 136 | 157 |
| 3 | 11 | 5 Nodes, packed (Long glass rods) | 2.35 | 115 | 137 |
| 4 | 11 | 5 Nodes, packed (Short glass rods) | 2.35 | 115 | 137 |
| 5 | 7 | 12 Nodes | 2.37 | 141 | 157 |
| 6 | 7 | Plain | 2.30 | 132 | 151 |

In all of the generators employed, the product capacity is found to be a linear function of the power input (watts). It is independent of gap spacing, and of generator design, e. g., the presence or absence of "nodes," and of glass rod packing. Further, the amount of product is found to be independent of variation in the organic feed so long as feed rates are in excess of the generator capacity. The maximum product capacity is a linear function of power (watts) input, and is stoichiometrically related to the amount of ozone produced by the electric discharge. There is no evidence of activation of the organic feed by the electric discharge.

In order that those skilled in the art better may understand how the present invention may be carried into effect using my "in-situ" generators, the following examples are given by way of illustration and not by way of limitation. In each of the examples, oxygen per se was employed.

EXAMPLE 1

Using generator No. 5, having the dimensions recited in Table I, five runs were conducted using oleic acid as the organic feed, with the results tabulated in Table III.

EXAMPLE 3

In order to establish the superiority of the "noded" design over a plain design using oleic acid as organic feed, comparative data was obtained as shown in Table V, below.

(a) Generator No. 5 having 12 nodes spaced about 2″ apart.

(b) Generator No. 6 having no nodes.

Both units were otherwise of similar dimensions and the same high voltage electrode was used in both, giving a 7 mm. spacing between the glass dielectrics of the high voltage and ground voltage electrodes.

TABLE V

| Model No. | #5 (Noded) | #6 (Plain) | Improvement |
|---|---|---|---|
| Effective Electrode Area (ft.²) | 2.37 | 2.30 | 3.0% |
| Operating Conditions: | | | |
| Operating Voltage (kv.) | 33 | 33 | |
| Power Input (Watts Net) | 154 | 153 | |
| Product Performance Comparison: | | | |
| Oleic Acid Feed (gms./hr.) | 75.3 | 63.5 | |
| Total Product (gms./hr.) | 88.1 | 74.0 | |
| Assayed Wt. Percent Ozonide in Product | 100 | 98.0 | |
| Ozonide Product (gms./hr.) | 88.1 | 72.5 | 21.5% |
| Equivalent Ozone (gms./hr.) | 12.82 | 10.55 | 21.5% |
| Electrical Performance Comparison (Calc. on ozone basis): | | | |
| Gms. Ozone/kwh | 83.3 | 69.0 | 20.7% |
| Kwh./lb. Ozone | 5.45 | 6.60 | 1.15 kwh./lb.O₃ |

TABLE III

| Run | Power Input | | Oleic Acid Feed, Gms./Hr. | Total Product, Gms./Hr. | Assayed Wgt. Percent Ozonide in Product | Ozonide Yield, Gms./Hr. | Equiv. Ozone, Gms./Hr. | Power Yield (Calc. on Ozone Basis) | |
|---|---|---|---|---|---|---|---|---|---|
| | Operating Voltage, kilovolts | Watts (net) | | | | | | Gms. of Ozone/Kwh. | Kwh./Lb. O₃ |
| 1 | 31.6 | 151 | 72.4 | 84.5 | 99 | 83.5 | 12.15 | 80.4 | 5.65 |
| 2 | 31.6 | 148 | 66.0 | 77.2 | 100 | 77.2 | 11.12 | 76.0 | 5.97 |
| 3 | 33.0 | 158 | 88.4 | 101.0 | 85.5 | 86.6 | 12.55 | 79.4 | 5.72 |
| 4 | 33.0 | 155 | 75.5 | 88.3 | 100 | 88.3 | 12.85 | 82.9 | 5.47 |
| 5 | 33.0 | 154 | 75.3 | 88.1 | 100 | 88.1 | 12.82 | 83.3 | 5.45 |
| | | | | | | | | ¹ 80.4 | ¹ 5.63 |

¹ Average.

EXAMPLE 2

In this example, diethyl maleate was reacted in a generator exactly similar to that employed in Example 1, with the results shown in Table IV. In this operation, the full capacity of the generator was not used, and the product yield and the power yield were, therefore, somewhat below those obtainable.

EXAMPLE 4

Using oleic acid as organic feed, several runs were performed in generator No. 6. This generator had a 7 mm. gap space between electrodes, and no nodes. Results are given in Table VI.

TABLE IV

| Power Input | | Diethyl Maleate Feed (Gms./Hr.) | Total Product (Gms./Hr.) | Wgt. Percent Ozonide in Product | Diethyl Maleate Ozonide Yield, Gms./Hr. | Equivalent Ozone, Gms./Hr. | Power Yield (Calc. on Ozone Basis) | |
|---|---|---|---|---|---|---|---|---|
| Operating Voltage, kv. | Watts (Net) | | | | | | Gms. Ozone/Kwh. | Kwh./Lb. O₃ |
| 30.5 | 147 | 34.4 | 44.0 | 100 | 44.0 | 9.6 | 65.3 | 6.95 |

This example shows the feasibility of ozonizing other unsaturated compounds (e. g. diethyl maleate) by "in-situ" ozonization.

TABLE VI

| Applied Voltage (kv.) | Product (gms./hr.) | Wgt. Percent in Ozonide Product | Ozonide (gms./hr.) | Oleic Acid Feed (gms./hr.) | Ozone, gms./hr. calc. | Found | Gms. O₃ Per kwh. | Kwh. Per Lb. O₃ | Net Watts |
|---|---|---|---|---|---|---|---|---|---|
| 33.0 | 110.0 | 74 | 81.6 | 98.0 | 11.85 | -------- | 79.5 | 5.70 | 149 |
| 33.0 | 103.5 | 76 | 79.0 | 92.0 | 11.40 | -------- | 74.5 | 6.10 | 153 |
| 33.0 | 86.3 | 89 | 77.0 | 75.0 | 11.20 | 12.10 | 74.7 | 6.07 | 150 |
| 33.0 | 74.0 | 98 | 72.5 | 63.5 | 10.55 | 11.10 | 69.0 | 6.60 | 153 |
| 33.0 | 64.8 | 100 | 64.8 | 55.5 | 9.42 | 9.40 | 61.6 | 7.35 | 153 |
| 33.0 | 60.0 | 100 | 60.0 | 51.0 | 8.73 | 10.00 | 59.0 | 7.70 | 148 |
| 33.0 | 59.8 | 100 | 59.8 | 51.0 | 8.70 | -------- | 57.2 | 7.95 | 150 |
| 33.0 | 58.8 | 100 | 58.8 | 50.0 | 8.56 | 9.40 | 57.9 | 7.84 | 148 |
| 33.0 | 54.9 | 100 | 54.9 | 47.0 | 8.00 | -------- | 53.3 | 8.52 | 150 |
| | | | | | | | | | [1] 150 |
| 28.9 | 97.2 | 72 | 70.0 | 87.0 | 10.20 | -------- | 82.9 | 5.48 | 123 |
| 28.9 | 77.9 | 84 | 65.5 | 68.4 | 9.53 | 10.50 | 77.5 | 5.86 | 123 |
| 28.9 | 69.8 | 94.5 | 66.0 | 60.2 | 9.60 | 10.30 | 78.4 | 5.80 | 123 |
| 28.9 | 61.8 | 99.5-100 | 61.8 | 53.0 | 8.99 | 9.15 | 74.6 | 6.08 | 121 |
| 28.9 | 57.1 | 100 | 57.1 | 49.0 | 8.31 | 8.89 | 70.5 | 6.45 | 118 |
| | | | | | | | | | [1] 122 |

[1] Average.

EXAMPLE 5

Using oleic acid as organic feed, several runs were conducted in generator No. 5. This generator had a 7 mm. gap space between electrodes and 12 nodes. Results are given in Table VII, which follows.

TABLE VII

| Applied Voltage (kv.) | Product (gms./hr.) | Wgt. Percent in Ozonide Product | Ozonide (gms./hr.) | Oleic Acid Feed (gms./hr.) | Ozone, gms./hr. calc. | Found | Gms. O₃ Per kwh. | Kwh. Per Lb. O₃ | Net Watts |
|---|---|---|---|---|---|---|---|---|---|
| 33.0 | 101.0 | 85.5 | 86.6 | 88.4 | 12.55 | 12.85 | 79.4 | 5.72 | 158 |
| 33.0 | 88.3 | 100 | 88.3 | 76.5 | 12.85 | 12.15 | 82.9 | 5.47 | 155 |
| 33.0 | 88.1 | 100 | 88.1 | 75.5 | 12.82 | 11.75 | 83.3 | 5.45 | 154 |
| 33.0 | 79.0 | 100 | 79.0 | 67.5 | 11.50 | 13.35 | 74.2 | 6.12 | 155 |
| 33.0 | 69.3 | 100 | 69.3 | 59.2 | 10.10 | 10.40 | 64.3 | 7.05 | 157 |
| | | | | | | | | | [1] 156 |
| 31.6 | 84.5 | 99 | 83.5 | 72.4 | 12.15 | -------- | 80.4 | 5.65 | 151 |
| 31.6 | 77.2 | 100 | 77.2 | 66.0 | 11.12 | -------- | 76.0 | 5.97 | 148 |
| 31.6 | 70.9 | 100 | 70.9 | 60.5 | 10.3 | -------- | 71.5 | 6.35 | 144 |
| 31.6 | 69.4 | 100 | 69.4 | 59.5 | 10.1 | -------- | 69.1 | 6.57 | 146 |
| 31.6 | 64.0 | 100 | 64.0 | 55.0 | 9.3 | -------- | 64.6 | 7.02 | 145 |
| 31.6 | 58.2 | 100 | 58.2 | 49.7 | 8.7 | -------- | 58.0 | 7.83 | 146 |
| | | | | | | | | | [1] 147 |

[1] Average.

Summarizing the data given in the above tables, in generator No. 5 (7 mm. noded), maximum power yield was realized at both 147 watt and 156 watt power input levels, and product yields of 5.67 kwh./lb. O₃ were obtained. In generator No. 6 (7 mm. plain), maximum power yield was not realized and limiting product yields of 6.3 and 6.8 kwh./lb. O₃ were obtained at 122 watts and 150 watts power, respectively. At the same operating voltage (refer to Table V), 33,000 volts, the noded generator had 21.5% greater product capacity and used 20.7% less electrical energy than did the plain generator. This increase in performance cannot be accounted for by the approximately 3% greater effective electrode area. It is probably due to a combination of such factors as longer residence time in the reaction zone, more effective film distribution and improved exposure of fresh organic surfaces by greater turbulence of the feed caused by the physical and electrical conditions in the area of the nodes.

From the foregoing description of my invention, it is apparent that a completely ozonized product (100% ozonide) can be produced when using an unsaturated organic compound at maximum product capacity with a material feed rate just sufficient to react with all the ozone produced in the ozonizer at any constant power consumption (watts.) At excess feed rates, all the ozone generated is absorbed, the power yield is constant, and ozonide production is constant; but the product is contaminated with feed material, and the weight per cent ozonide decreases in a predictable manner with increase in feed. At feed rates insufficient to react with the ozone produced, completely ozonized product is formed in amounts which decrease stoichiometrically as feed rate is reduced; and also, the power yield is reduced in direct relation to the unused ozone.

Although the invention has been described primarily in connection with concentric glass-type ozonizers, it is not limited thereto since the present design may also be incorporated into units having a parallel plate geometry. The design may further be incorporated into units of the parallel plate type or of the concentric tube type having a tapered or conical electrode geometry, respectively. Furthermore, it may be incorporated into units having only one or both electrodes covered with a suitable dielectric material, e. g., glass (Pyrex, a high-boron-content boro-silicate glass; Vycor, a high-silica glass with small amount of boron oxide; soft glass; etc.), quartz, ceramic, etc.

Further illustrative examples of oxygen-containing gases which may be utilized in my invention include air, carbon dioxide, oxygen in admixture with an inert diluent gas, for instance, nitrogen, argon, neon, etc., or mixtures of these gases with or without an inert diluent.

While my invention has been described primarily in connection with unsaturated organic compounds, it is not restricted thereto since its range of utility includes all organic compounds, saturated as well as unsaturated, capable of reacting with ozone under the described reaction conditions.

What I claim as new and desire to secure by Letters Patent of the United States is:

1. An apparatus of the silent electric discharge type for the in situ treatment of liquid organic compounds with ozone generated by the silent electric discharge of an oxygen containing gas, comprising a smaller inner dielectric tubular member positioned within an outer tubular member and in spaced relationship therewith, a portion of the walls of said tubular members defining a reaction zone which is under electrical stress during reaction, an inlet positioned adjacent the top of said outer tubular member for introducing an organic feed into the reaction zone, weirs in said outer tubular member positioned adjacent to and below said inlet for distributing the organic feed around the inner surface of said outer tubular member, the walls of one of the tubular members within the stressed reaction zone of the apparatus having a series of spaced circumferential recesses whereby the flow of organic feed is controlled and improved to give superior liquid film distribution and enhanced turbulent exposure of reactive organic surface in the reaction zone of said apparatus, means for introducing an oxygen-containing gas into the reaction zone, and electrodes for producing the silent electric discharge consisting of a salt solution contained in said inner tube and in a jacket surrounding the outer tube.

2. An apparatus of the silent electric discharge type for the in situ treatment of liquid organic compounds comprising an outer tubular member, a smaller inner tubular member positioned within the said outer tubular member in spaced, coaxial relationship therewith, the inner tubular member having an enlarged upper section engaging an adjacent section of said outer tubular member in sealing relationship, a portion of the walls of said tubular members defining a reaction zone which is under electrical stress during reaction, an inlet positioned adjacent the top of said outer tubular member for introducing a liquid organic feed into the apparatus, weirs in said outer tubular member positioned adjacent to and below said inlet for distributing the organic feed around the inner surface of said tubular member, said outer tubular member having a restricted bottom section terminating in an outlet for the reaction products formed in the reaction zone, the inner tubular member having a closed bottom positioned above said outlet, the outer tubular member having spaced, circumferential recesses extending away from the stressed reaction zone whereby the flow of organic feed is controlled and improved to give superior liquid film distribution and enhanced turbulent exposure of organic surface in the reaction zone of said apparatus, means for introducing an oxygen-containing gas into the reaction zone, a high voltage electrode comprising a salt solution within said inner tubular member, and a salt solution in a jacket surrounding said outer tubular member for regulating the temperature of the apparatus and providing a second electrode.

3. An ozonization apparatus of the silent electric discharge type comprising an outer tubular member, a smaller inner tubular member positioned within the said outer tubular member in spaced, coaxial relationship therewith, the inner tubular member having an enlarged upper section engaging an adjacent section of said outer tubular member in sealing relationship, a portion of the walls of said tubular members defining a reaction zone which is under electrical stress during reaction, an inlet positioned adjacent the top of said outer tubular member for introducing a liquid organic feed into the apparatus, a series of circumferentially and inwardly extending distributing rings positioned below the inlet and above the reaction zone for distributing said feed over the surface of said inner tubular member, said outer tubular member having a restricted bottom section terminating in an outlet for the reaction products formed in the reaction zone, the inner tubular member having a closed bottom positioned above said outlet, the walls of at least one of said tubular members defining the reaction zone having spaced, circumferential recesses extending away from the reaction zone whereby the flow of organic feed is controlled and improved to give superior liquid film distribution and enhanced turbulent exposure of reactive organic surface in the reactive zone of said apparatus, means for introducing an oxygen-containing gas into the reaction zone, a high voltage electrode comprising a salt solution within said inner tubular member, and a salt solution in a jacket surrounding said outer tubular member for cooling said apparatus and providing a second electrode.

References Cited in the file of this patent

UNITED STATES PATENTS

| | | |
|---|---|---|
| 1,176,551 | Heinemann | Mar. 21, 1916 |
| 2,089,793 | Hartman | Aug. 10, 1937 |
| 2,688,594 | Oosterman | Sept. 7, 1954 |

FOREIGN PATENTS

| | | |
|---|---|---|
| 6,872 | Great Britain | Mar. 31, 1905 |
| 823,428 | France | Oct. 18, 1937 |